US012536682B2

(12) United States Patent
Kainth et al.

(10) Patent No.: US 12,536,682 B2
(45) Date of Patent: Jan. 27, 2026

(54) METHOD AND SYSTEM FOR GENERATING A DEPTH MAP

(71) Applicant: Blackmagic Design Pty Ltd, Port Melbourne (AU)

(72) Inventors: Komal Kainth, Colorado Springs, CO (US); Joel David Gibson, Colorado Springs, CO (US)

(73) Assignee: Blackmagic Design Pty Ltd, Port Melbourne (AU)

( * ) Notice: Subject to any disclaimer, the term of this patent is extended or adjusted under 35 U.S.C. 154(b) by 482 days.

(21) Appl. No.: 18/301,032

(22) Filed: Apr. 14, 2023

(65) Prior Publication Data

US 2023/0334685 A1    Oct. 19, 2023

Related U.S. Application Data

(60) Provisional application No. 63/331,396, filed on Apr. 15, 2022.

(51) Int. Cl.
*G06T 7/55*    (2017.01)
*G06T 7/38*    (2017.01)

(52) U.S. Cl.
CPC ............... *G06T 7/55* (2017.01); *G06T 7/38* (2017.01); *G06T 2207/10016* (2013.01); *G06T 2207/10028* (2013.01); *G06T 2207/20084* (2013.01)

(58) Field of Classification Search
CPC .. G06T 7/50; G06T 7/55; G06T 7/579; G06T 7/38; G06T 2207/10016; G06T 2207/10028; G06T 2207/20084; G06T 2207/20081; G06T 2207/20182; G06T 5/00; G06T 5/50; G06T 5/70; G06N 3/02–0985

See application file for complete search history.

(56) References Cited

U.S. PATENT DOCUMENTS 12,243,251 B1 *   3/2025   Kopf ................... G06T 7/70
2022/0414824 A1 * 12/2022   Chou ................... G06T 3/04

FOREIGN PATENT DOCUMENTS

WO    2011/060579 A1    5/2011

OTHER PUBLICATIONS

Kopf, J. et al., "Robust Consistent Video Depth Estimation" Proceedings of the IEEE/CVF Conference on Computer Vision and Pattern Recognition (CVPR), 2021, pp. 1611-1621 (Year: 2021).*
Ibrahim, Mostafa Mahmoud, et al. "Depth map artefacts reduction: A review." IET Image Processing 14.12 (2020): 2630-2644. (Year: 2020).*
Li, Siyuan, et al. "Enforcing Temporal Consistency in Video Depth Estimation." 2021 IEEE/CVF International Conference on Computer Vision Workshops (ICCVW). IEEE, 2021. (Year: 2021).*

(Continued)

*Primary Examiner* — Geoffrey E Summers
(74) *Attorney, Agent, or Firm* — Seed Intellectual Property Law Group LLP

(57) ABSTRACT

A method and system for generating a depth map corresponding to a frame of a sequence of frames in a video clip is disclosed. This can involve generating a single image depth map for each of a plurality of frames, scaling the single image depth maps, and processing a time sequence of scaled single image depth maps to generate said depth map corresponding to the frame of the sequence of frames in the video clip.

20 Claims, 14 Drawing Sheets

(56) References Cited

OTHER PUBLICATIONS

Liu, P. et al., "SelFlow: Self-Supervised Learning of Optical Flow" 2019 IEEE/CVF Conference on Computer Vision and Pattern Recognition (CVPR), Long Beach, CA, USA, 2019, 10 pages.

Ranftl, R. et al., "Towards robust monocular depth estimation: Mixing datasets for zero-shot cross-dataset transfer" TPAMI, 2020, accessible at https://github.com/isl-org/MiDaS, pp. 1-14.

Kopf, J. et al., "Robust Consistent Video Depth Estimation" Proceedings of the IEEE/CVF Conference on Computer Vision and Pattern Recognition (CVPR), 2021, pp. 1611-1621.

Karsch, K. et al., "Depth Transfer: Depth Extraction from Video Using Non-parametric Sampling," Journal of Latex Class Files, vol. 6, No. 1, Jan. 2007. arxiv.org, Cornell University Library, 201 Olin Library Cornell University, Ithaca, NY 14853, Dec. 24, 2019, 16 pgs.

Extended European Search Report for European Application No. 23167816.0 dated Sep. 6, 2023, 6 pgs.

* cited by examiner

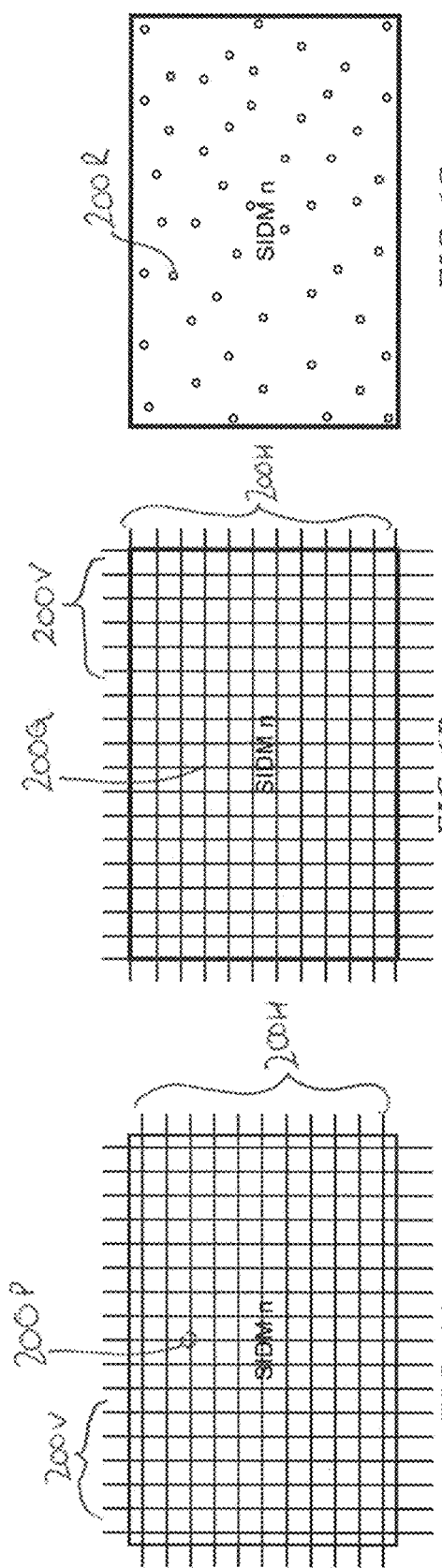
FIG. 6A
FIG. 6B
FIG. 6C
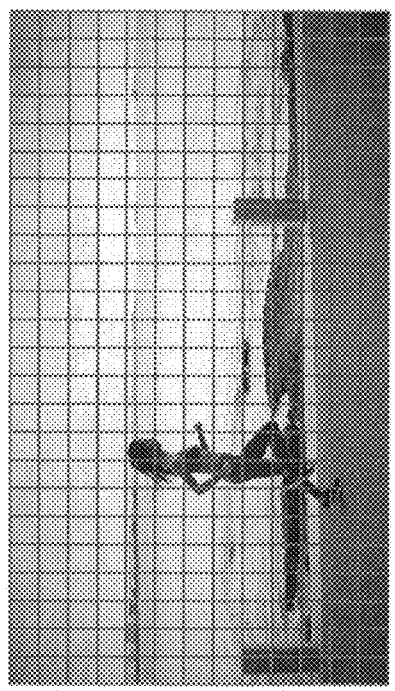
(b)
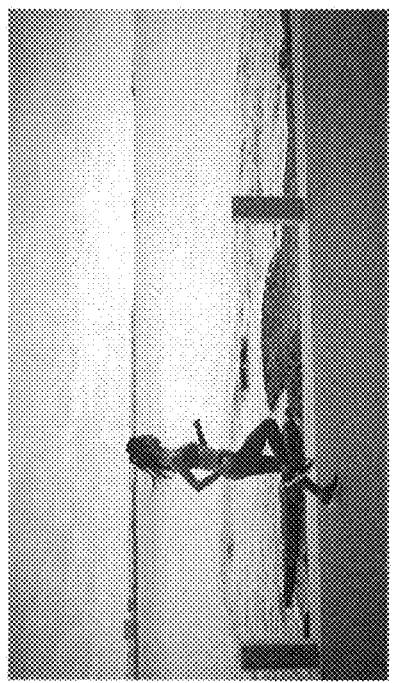
(a)
FIG. 7

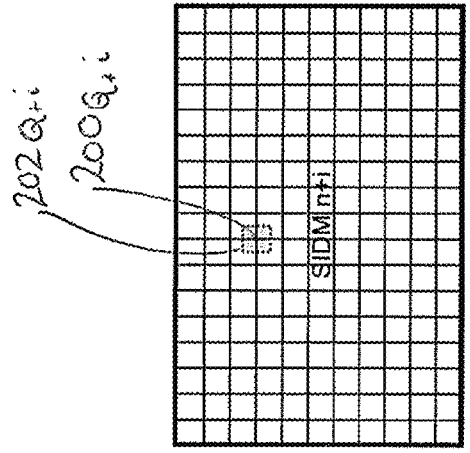
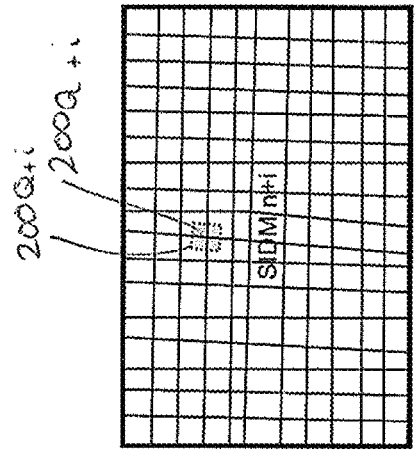
*FIG. 8*
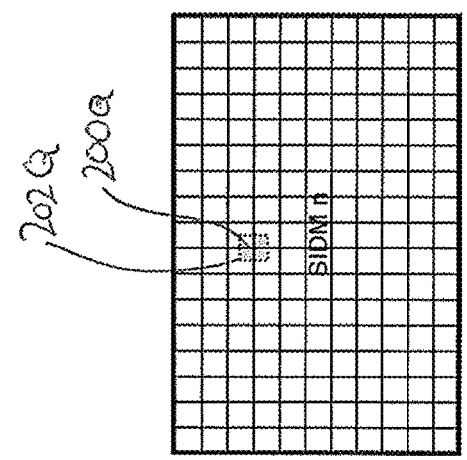
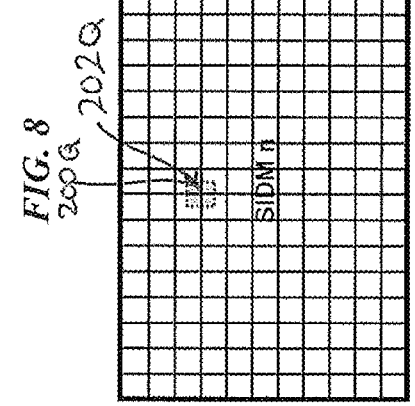
*FIG. 9*
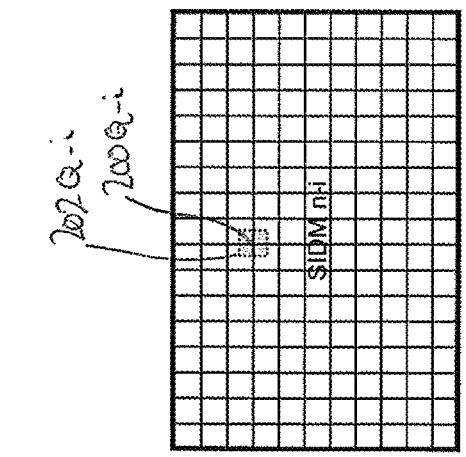
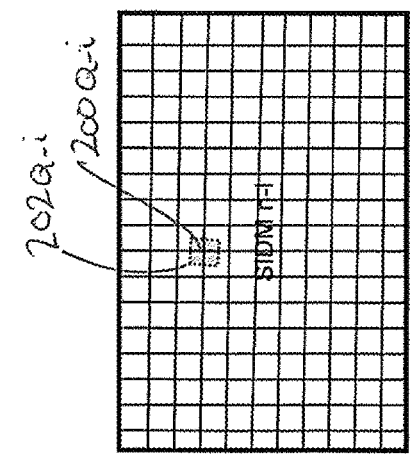

METHOD AND SYSTEM FOR GENERATING A DEPTH MAP

TECHNICAL FIELD

The present disclosure relates to methods and systems relating to depth estimation in images such as in frames of a video clip comprising a time sequence of frames.

DESCRIPTION OF THE RELATED ART

In digital movie post-production there is sometimes a need to estimate the depth of one or more elements that are visible in a frame of video. For example, it may be necessary for a given image processing technique to be either applied, or not applied, to an element based on its depth, or for an image processing technique to be applied in a manner that varies with depth. A similar need also arises commonly in the field of computer vision. Depth can mean the real or implied distance from a camera capturing an image or a virtual point of view in an artificially generated image, to an object (or point on an object).

The inventors are aware of techniques for depth estimation. Such techniques generate a depth map that comprise an estimated a depth value for each pixel in the image. These can be represented visually as a color or greyscale image showing the depth as corresponding color or grey level. For example, FIG. 1 shows an image frame from a movie clip in image (a) and a corresponding depth map in image (b). In the depth map, image (b), the depth of each pixel is represented as a grey level, with lighter pixels having lower depth than darker pixels, such that white pixels are the nearest and black the farthest from the camera that captured the image.

Some techniques for depth estimation rely on binocular or stereo images, to enable depth to be determined by triangulation. But stereo images are typically not available. Monocular depth estimation techniques also exist. These typically perform depth estimation on a single image (e.g., a photograph or single frame of a movie). However, when single image depth estimation techniques are applied to each frame in a time sequence of frames comprising a movie clip, it is common for "flicker" to occur in the depth map. The flicker results from the depth estimate for an object or region (or points in an object or region) changing from one frame to the next frame. A small change in absolute depth may be acceptable, but erroneous relative changes can be more problematic. Most noticeable is when (without an appreciable scene change or camera movement) the relative depth of two objects changes between frames so that one object moves in front or behind of another object that it was previously behind or in front of.

The systems, devices, methods and approaches described in the specification, and components thereof are known to the inventors. Therefore, unless otherwise indicated, it should not be assumed that any of such systems, devices, methods, approaches or their components described are citable as prior art merely by virtue of their inclusion in the specification, or that such systems, devices, methods, approaches and components would ordinarily be known to a person of ordinary skill in the art.

BRIEF SUMMARY

In a first aspect there is provided a method of generating a depth map corresponding to a frame of a sequence of frames in a video clip. The method may comprise:

generating a single image depth map for each frame of a plurality of frames;

scaling the single image depth map for each frame to generate a scaled single image depth map for said each frame by applying a scale value to each pixel of said single image depth map; and processing a time sequence of scaled single image depth maps to generate said depth map corresponding to the frame of the sequence of frames in the video clip.

The corresponding scale value for each pixel of the single image depth map may be generated using a method comprising: for each grid point of a plurality of grid points which are arranged across the frame:

generating an initial scale value using a depth value for the grid point; and depth values corresponding to the same grid point from a plurality of temporally related frames;

generating a final scale value for said grid point on the basis of said grid point's initial scale value and the initial scale value of one or more neighboring grid point; and determining corresponding scale values for application to each pixel of said single image depth map from the final scale values of the grid points.

The step of generating an initial scale value using a depth value for the grid point and depth values for the same grid point from a plurality of temporally related frames can comprise determining a depth value for the grid point in said frame by determining an average depth value for a region including the grid point; and determining depth values corresponding to the same grid point for a plurality of temporally related frames comprises determining a correspondence between content of said frame and content of said temporally related frames such that a location corresponding to said grid point can be determined for each of the plurality of temporally related frames, and determining an average depth value for a region including said location in each temporally related frame to determine a depth value corresponding to said grid point for each temporally related frame.

The initial scale value for each grid point can be determined using a ratio of: a measure of central tendency of a group of depth values including at least the depth values for the same grid point from the plurality of temporally related frames, to the depth value for the grid point. For example, the measure of central tendency could be the median. The group of depth values could include the depth value for the grid point.

The method can include defining a mask including pixels of said frame in which the single image depth map is determined to be either or both of: unreliable based on optical flow analysis of the plurality of frames; or have a depth greater than a threshold depth.

In some embodiments, determining a correspondence between the content of said frame and the content of said temporally related frames can include analyzing optical flow between temporally adjacent frames and generating a warped depth map of each of said plurality of temporally related frames in accordance with the optical flow, whereby said location corresponding to said grid point is aligned with said grid point, and determining the average depth value for the region around said location in each temporally related frame using the warped depth map.

In some embodiments, determining a correspondence between the content of said frame and the content of said temporally related frames can include analyzing optical flow between temporally adjacent frames and tracking the location of said grid point in each of said temporally related frames using said optical flow and determining the average depth value for a region around said location in each temporally related frame.

In some embodiments, pixels that are included in the mask are excluded from either or both of: determining a depth value for the grid point by determining an average depth value for a region including the grid point; and/or determining depth values corresponding to the same grid point for a plurality of temporally related frames.

In some embodiments, the step of generating a final scale value for said grid point on the basis of said grid point's initial scale value and an initial scale value of one or more neighboring grid points comprises determining a relative contribution of each of said one or more neighboring grid points and said grid point's initial scale value. The relative contribution for said one or more neighboring grid points can be determine in some embodiments using said mask.

In some embodiments, generating a final scale value for said grid point on the basis of said grid point's initial scale value and an initial scale value of one or more neighboring grid point includes solving a series of linear equations representing an initial scale value of each of said grid points and the initial scale value for each of said grid point's neighboring grid points.

In some embodiments, determining scale values for application to each pixel of said single image depth map from the final scale values of the grid points, can comprise generating a scale value for each pixel between said grid points by interpolation. If there are pixels outside said grid points, these can have scale values determined by extrapolation.

In some embodiments, the scale values for application to each pixel of said single image depth map from the final scale values of the grid points can be determined by assigning a scale value for each pixel based on a position relative to said grid points. For example, all pixels in an area around each grid point may take the scale value corresponding to the grid point.

Generating a single image depth map for each frame may use machine learning techniques. For example, it may comprise using a deep learning model to generate said single image depth map. The deep learning model may be a convolutional neural network, or other suitable model.

The method can be repeated or continued to generate a depth map for at least one additional frame of the video clip.

In some embodiments, the depth map can be generated at a lower resolution than the frame. For example, it may be performed at a fractional resolution, e.g., ½, ¼ resolution. In other embodiments, the depth map can be generated at the same resolution as the frame.

In a further aspect there is provided a computer system including a processor operating in accordance with execution instructions stored in a non-transitory storage media, whereby execution of the instructions configures the computer system to perform an embodiment of a method described herein. The computer system can be a non-linear editor for use in editing video and optionally audio media.

There is also provided a non-transitory computer-readable storage media storing thereon execution instructions which when executed by a processor cause the processor to perform an embodiment of a method as described herein.

In a further aspect there is provided a computer software product containing execution instructions which when executed by a processor cause the processor to perform an embodiment of a method as described herein. The computer software product can comprise a non-linear editing software product or video effects software product, for example the Applicant's Davinci Resolve or Fusion software could perform embodiments of a method as described herein.

While the invention(s) disclosed herein are amenable to various modifications and alternative forms, specific embodiments are shown by way of example in the drawings and are described in detail. It should be understood, however, that the drawings and detailed description are not intended to limit the invention(s) to the particular form disclosed. Furthermore, all alternative combinations of two or more of the individual features mentioned or evident from the text or drawings comprise additional aspects or inventive disclosures, which may form the subject of claims.

BRIEF DESCRIPTION OF THE SEVERAL VIEWS OF THE DRAWINGS

FIGS. 6A to 6C illustrate example arrangements of grid points in three embodiments.

FIG. 7 shows a frame (a) and the frame overlaid (b) with a grid of FIG. 6B.

FIG. 8 illustrates corresponding regions associated with grid points in temporally related frames.

FIG. 9 illustrates a further embodiment of corresponding regions associated with grid points in temporally related frames using warping.

DETAILED DESCRIPTION

In the following description, numerous specific details are set forth in order to provide a thorough understanding of the present disclosure. It will be apparent, however, that the present disclosure may be practiced without these specific details. In some instances, structures and devices are shown in block diagram form in order to avoid unnecessary obfuscation of salient details.

One approach to depth estimation for a movie clip that is known to the inventors, and which seeks to address the temporal flicker problem is proposed in "*Robust Consistent Video Depth Estimation*" Johannes Kopf, Xuejian Rong, Jia-Bin Huang; Proceedings of the IEEE/CVF Conference on Computer Vision and Pattern Recognition (CVPR), 2021, pp. 1611-1621, the contents of which are incorporated herein by reference for all purposes, though the applicant does not concede that said document or other documents referenced therein would be known by a person of ordinary skill in the art. This approach has the drawback that it is computationally expensive, and processing can take seconds per frame to generate an output depth map. Embodiments described below address this drawback or at least provide an alternative.

Figure 1:
FIG. 1 shows a frame of a movie clip (a) and a corresponding depth map (b) illustrating estimated depth in grey levels.
Figure 1:
Figure 2:
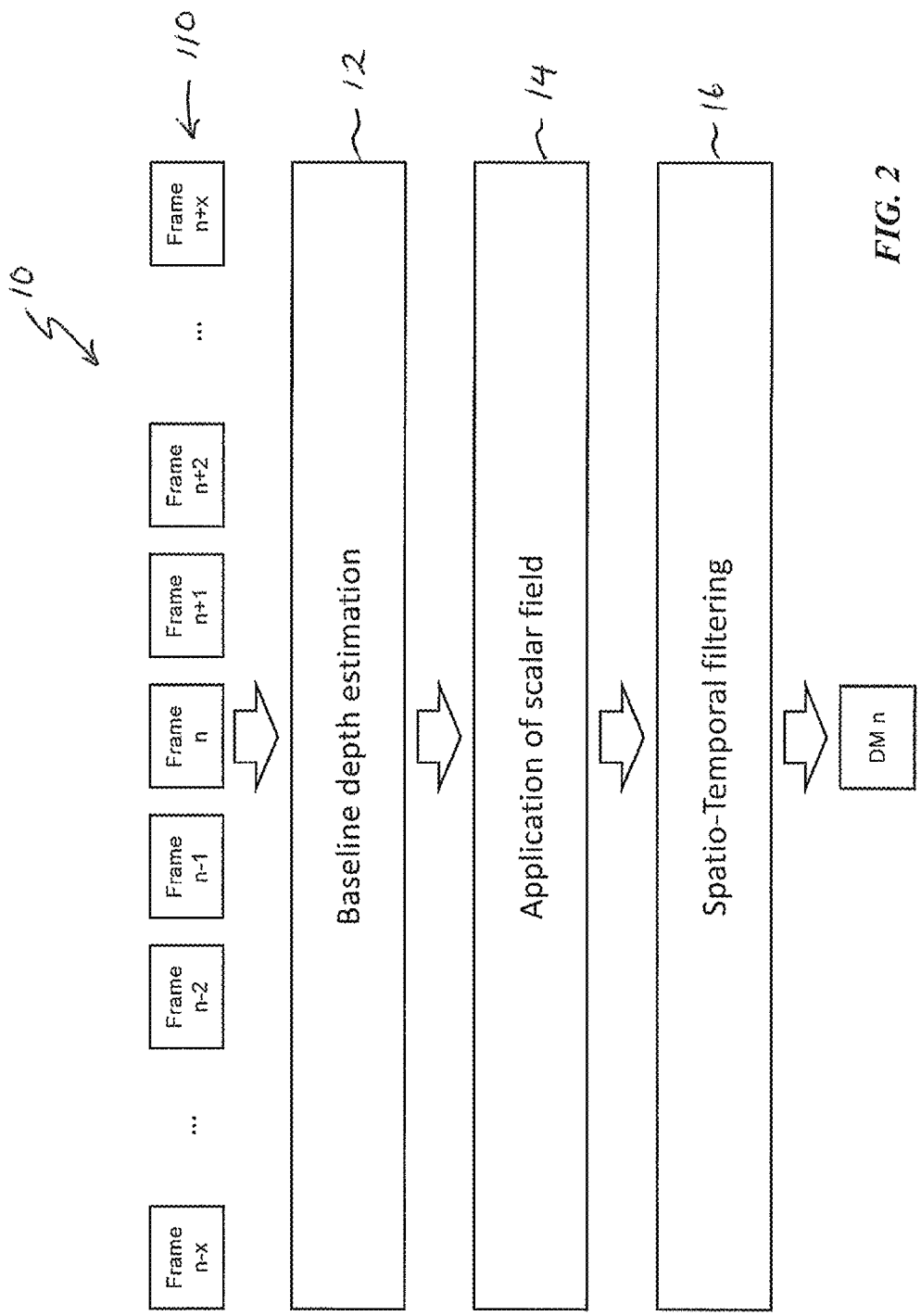
FIG. 2 is flowchart showing an overview of one embodiment of a method for generating a depth map for a frame of a video clip.

FIG. 2 is a flowchart that schematically illustrates an overview of an embodiment of a method for generating a depth map corresponding to a frame n (frame n) of a sequence of frames in a video clip.

The method 10 begins with a video clip 110 having a plurality of frames (frame n–x . . . frame n+y) and finally generates a depth map for frame n (DM n). The method can be performed again to generate a depth map for any other frame (e.g., frame n+1, n–1 etc.). It will become apparent however that not all steps, actions, sub-steps will need to be repeated in full as data may be reused from one frame to the next.

At step 12, baseline depth estimation is performed to generate single image depth map (SIDM) for frame n, and at least some frames temporally adjacent to frame n. In some embodiments, baseline depth estimation 12 can be performed on all frames of the clip or only the frames necessary to complete the method in respect of frame n.

Next, step 14 involves application of a scalar field to the baseline depth estimation from step 12. The baseline SIDM values are multiplied by corresponding values in the scalar field. In at least one embodiment, the scalar field is calculated using SIDM values from a time series of frames (including frame n). This may help to address large area flickering in the SIDM from one frame to the next.

In step 16, spatio-temporal filtering is performed, using scaled single image depth maps of a plurality of frames, to generate the depth map for frame n (DM n). This step may take a weighted average of corresponding spatial regions of a scaled depth maps over the plurality of frames.

Figure 3:
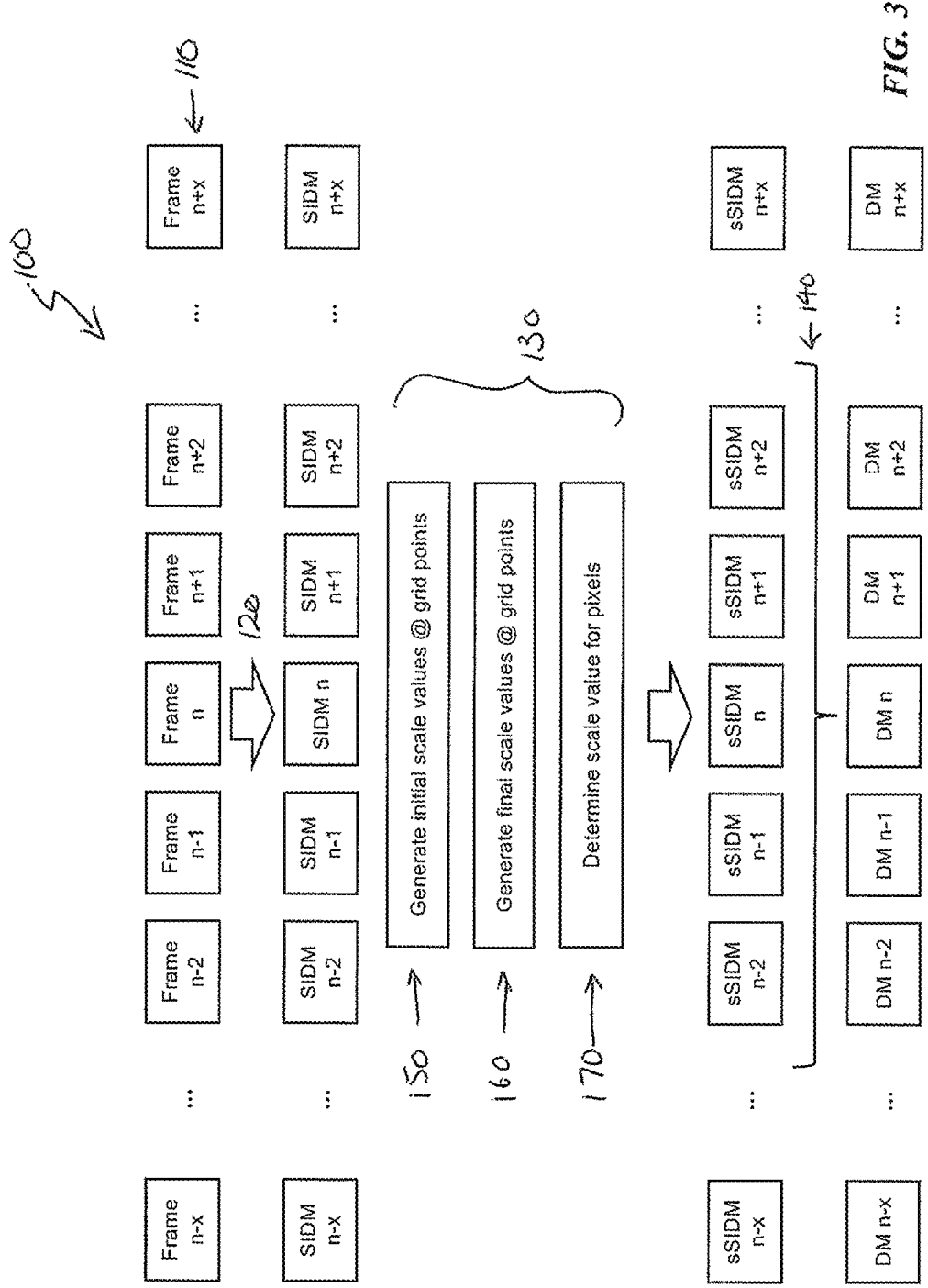
FIG. 3 is a flowchart showing further details of an embodiment according to the overview of FIG. 2.

FIG. 3 is a flowchart that illustrates steps in a method of generating a depth map according to an embodiment of the method of FIG. 2.

Figure 4:
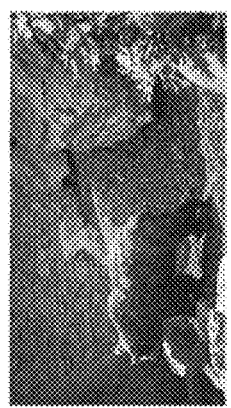
FIG. 4 shows a series of frames of a video clip.
Figure 4:
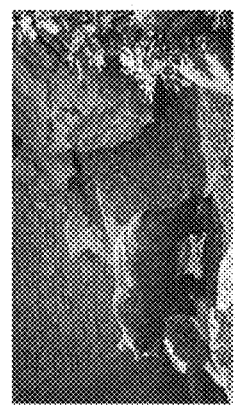
Figure 4:
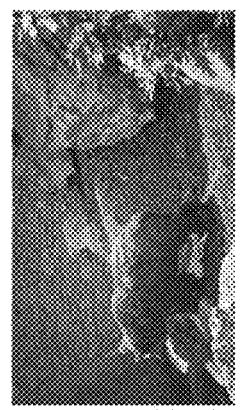
Figure 4:
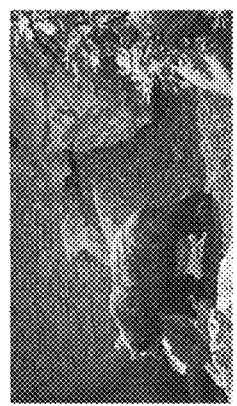
Figure 4:
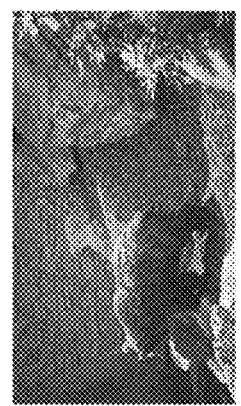
Figure 4:
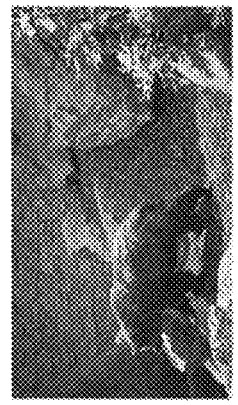
Figure 4:
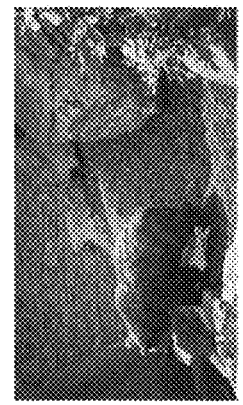

As with FIG. 2, the method 100 begins with obtaining a video clip 110. The video clip could be obtained, for example, by reading from memory, receiving a video clip via transmission channel over a wired or wireless network, or directly capturing the video clip in a camera. The video clip 110 comprises a plurality of frames. The plurality of frames 110 include x frames before frame n (for which the depth map is to be created) and y frames after frame n (Frame n–x . . . n . . . n+y). x and y are arbitrary numbers of frames and x and y may be equal or unequal. FIG. 4 shows a series of images for part of a video clip. The images in FIG. 4 show a bear walking, and comprise 7 frames in total. There are 3 frames before (Frames n–3 to n–1) and 3 frames after (frames n+1 to n+3) the frame (frame n) for which a depth map will be created.

Figure 5:
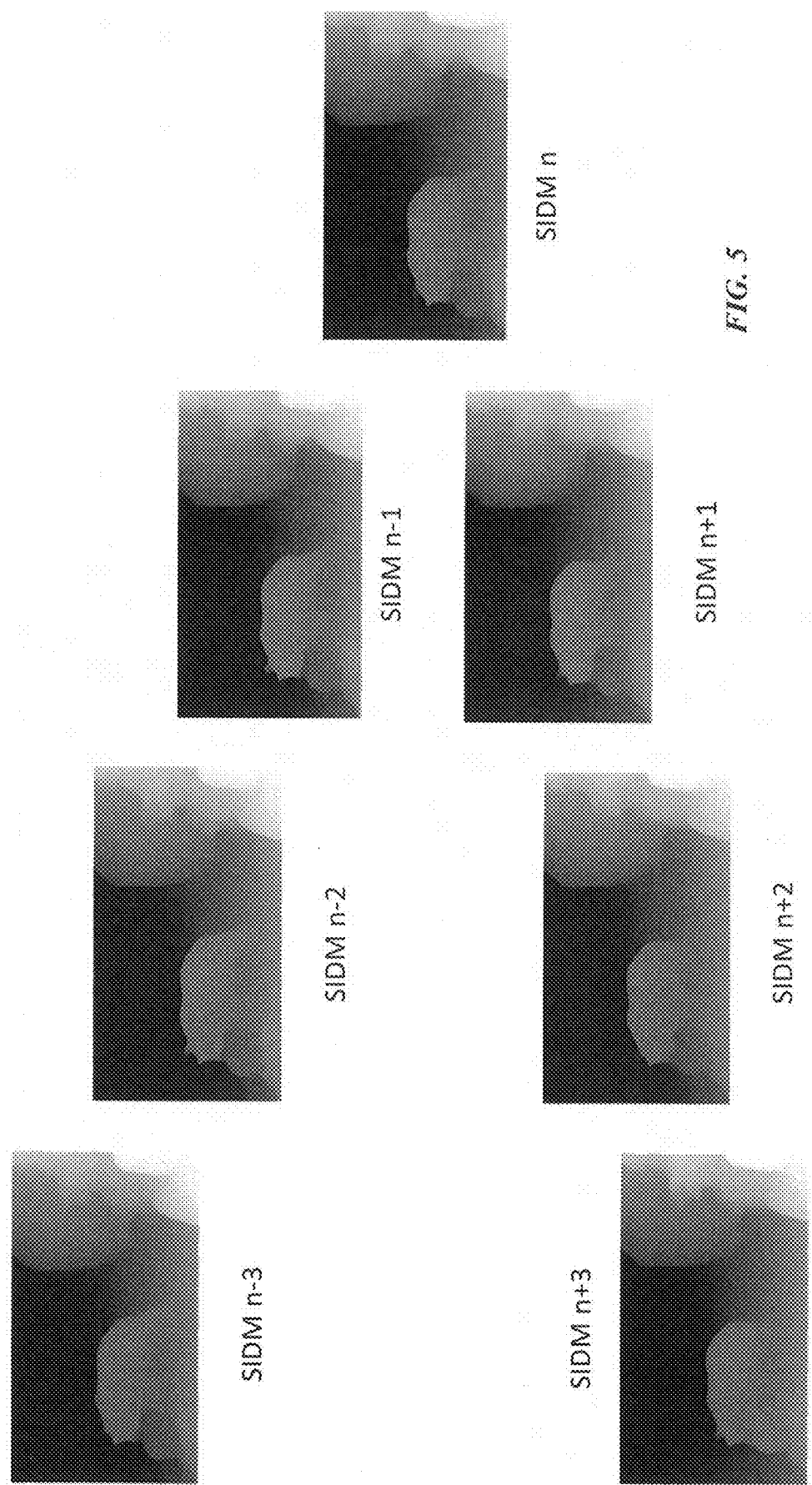
FIG. 5 shows a series of single image depth maps corresponding to the frames of FIG. 4.

At step 120, baseline depth estimation is performed by generating a single image depth map (SIDM) for each of a plurality of frames. The plurality of frames processed in this step may be all frames in the video clip 110 or just those needed to process Frame n. The single image depth map corresponding to Frame n is labelled SIDM n. FIG. 5 shows single image depth maps corresponding to the frames of the clip from FIG. 4. The 7 single image depth maps are labelled (SIDM n–3 . . . SIDM n+3). The same naming convention is used for other frames and single image depth maps. Furthermore, throughout the description and claims a naming convention will be used whereby, if an entity or action relates to a specific frame (e.g., frame n) it will be labelled with an "n", similarly entities and actions related to a given frame will be named with a corresponding label.

In some embodiments, single image depth estimation can be performed using a convolutional neural network, such as MiDaS. MiDas is described more fully by Rene Ranftl, Katrin Lasinger, Konrad Schindler, and Vladlen Koltun in "Towards robust monocular depth estimation: Mixing datasets for zero-shot cross-dataset transfer" TPAMI, 2020, and can be accessed at the repository https://github.com/isl-org/MiDaS.

The original frame may be scaled to 384×n, where n depends on aspect ratio of the input clip and represents the length of the short side of the image frame. The output of MiDaS produces inverse depth, such that the output equals 1/Depth. This is represented in FIG. 5 in a greyscale image for each SIDM wherein the estimated depth of the image content is represented as a grey level, with lighter pixels having lower estimated depth than darker pixels, such that white pixels are those areas deemed as nearest and black pixels are those areas deemed the farthest from the point of view from which the image is captured (which will be the camera in an image of a real scene, or some chosen point in an artificially created image).

Returning to FIG. 3, in step 130 the single image depth map (SIDM n) is scaled to generate a scaled single image depth map (sSIDM n). In this embodiment, step 130 includes the following sub-processes:

At step 150, initial scale values are generated at a plurality of grid points which are arranged across the frame.

At step 160, a final scale value for each grid point is generated on the basis of the grid point's initial scale value (determined in step 150) and the initial scale value of one or more neighboring grid points (determined in step 150 in respect of those grid points).

Because there are fewer grid points than pixels in the single image depth map, at step 170 scale values are determined for each pixel of the single image depth map from the final scale values of the grid points. This may include interpolating scale values between the grid points, and if necessary, extrapolating scale values outside them. In some embodiments, groups of pixels may share scale values to avoid the need to interpolate the scale values up to the full resolution of the frame.

Details of these sub-processes will be described below.

Generating Initial Scale Values

At step 150, initial scale values are generated at a plurality of grid points which are arranged across the frame. The grid points may be arranged in a regular pattern or array across the frames, or placed in an irregular distribution around the frame, or placed at specific positions based on the image. FIG. 6A to 6C illustrate several ways in which grid points may be arranged with respect to a frame and its single image depth map (which typically have the same dimensions or aspect ratio). FIGS. 6A and 6B illustrate examples where the grid points are arranged in a regular array with respect to the frame. FIG. 6A shows the single image depth map of frame n (SIDMn) overlaid with a grid of lines. Each intersection between the vertical lines (200V) and horizontal lines (200H) define grid points such as grid point 200P. The number and position of the grid lines (200V and 200H) will define the location and number of grid points. FIG. 6B illustrates a similar arrangement of grid points (e.g., 200Q)

to those of FIG. 6A except that the grid points are arranged by vertical and horizontal grid lines that are offset with respect to those of FIG. 6A. Accordingly FIG. 6B has grid points positioned at the edge of the frame, whereas in FIG. 6A its outermost grid points are spaced inwardly from the edge of the frame. Other grid shapes, or grid lines set at an angle to the horizontal or vertical are possible in some embodiments. The grid points may be placed in a regular n×m array. Despite use of the term "grid points" for convenience, some embodiments may have grid points that do not fall on a grid, use a non-rectilinear grid, are irregularly spaced or randomly positioned or have grid points arranged by some other predetermined scheme (such as points chosen based on image analysis). FIG. 6C illustrates an example where grid points (e.g., 200R) are placed randomly around the frame. In an illustrative embodiment shown in FIG. 7, the grid points are placed in an n×m array having 25×14 layout. In FIG. 7, the frame shows a frame in panel (a) from a clip which shows a jogger running by a body of water. Panel (b) shows the frame overlaid with a grid having 25 (vertical) lines across the frame and 14 (horizontal) lines spaced up the image. This grid of lines defines 375 grid points arranged in a 25×14 array and located at the intersections of the lines. Note that this embodiment follows the example of FIG. 6B and includes grid points on the edge of the frame.

In at least one embodiment, the step of generating an initial scale value for a given grid point uses a depth value for the grid point; and the depth values for the same grid point from a plurality of temporally related frames.

Determining a depth value for the grid point in said frame may involve determining an average depth value for a region including the grid point. FIG. 8 illustrates how a region including a grid point may be defined in at least one embodiment. FIG. 8 schematically illustrates a sequence of single image depth maps for frames n−i to n+i. In SIDM n, a grid point 200Q is illustrated, along with a region around it 202Q containing depth values. The region 202Q extends to the halfway point between the vertical and horizontal lines that intersect to define the grid point 200Q and their neighboring horizontal and vertical lines. Thus the region is the same shape as the grid defining the grid points, but offset so that the grid point is in the center of its region. The region may be square or rectangular depending on the spacing of the grid, or in some embodiments another geometry e.g., circular, if the region is defined by a radius around the grid point. FIG. 8 also shows depth maps for temporally related frames n−i and n+i. In this example, each frame will have a grid point corresponding to 200Q and its corresponding region or area 202Q. These are illustrated in SIDM n−i and SIDM n+i as grid points 200Q−i and 200Q+i which are surrounded by regions 202Q−i and 202Q+i.

In an embodiment, the average value of the SIDM can be determined for the region and assigned to the grid point. This same process can be performed for the same grid point for a plurality of temporally related frames. In at least one embodiment, the temporally related frames can be a series of frames that come before or after frame n. In at least one embodiment, three frames before and after are used, but more or fewer can be used.

Since the content of the images will change from frame to frame, and the depth analysis is aimed at ensuring that the content is treated consistently to avoid flickering in the depth map, one or more embodiments may first determine a correspondence between the content of said frame and the content of said temporally related frames, and in some embodiments pixels or groups of pixels where the correspondence is weak may be treated differently or excluded from certain processing steps.

Figure 10:
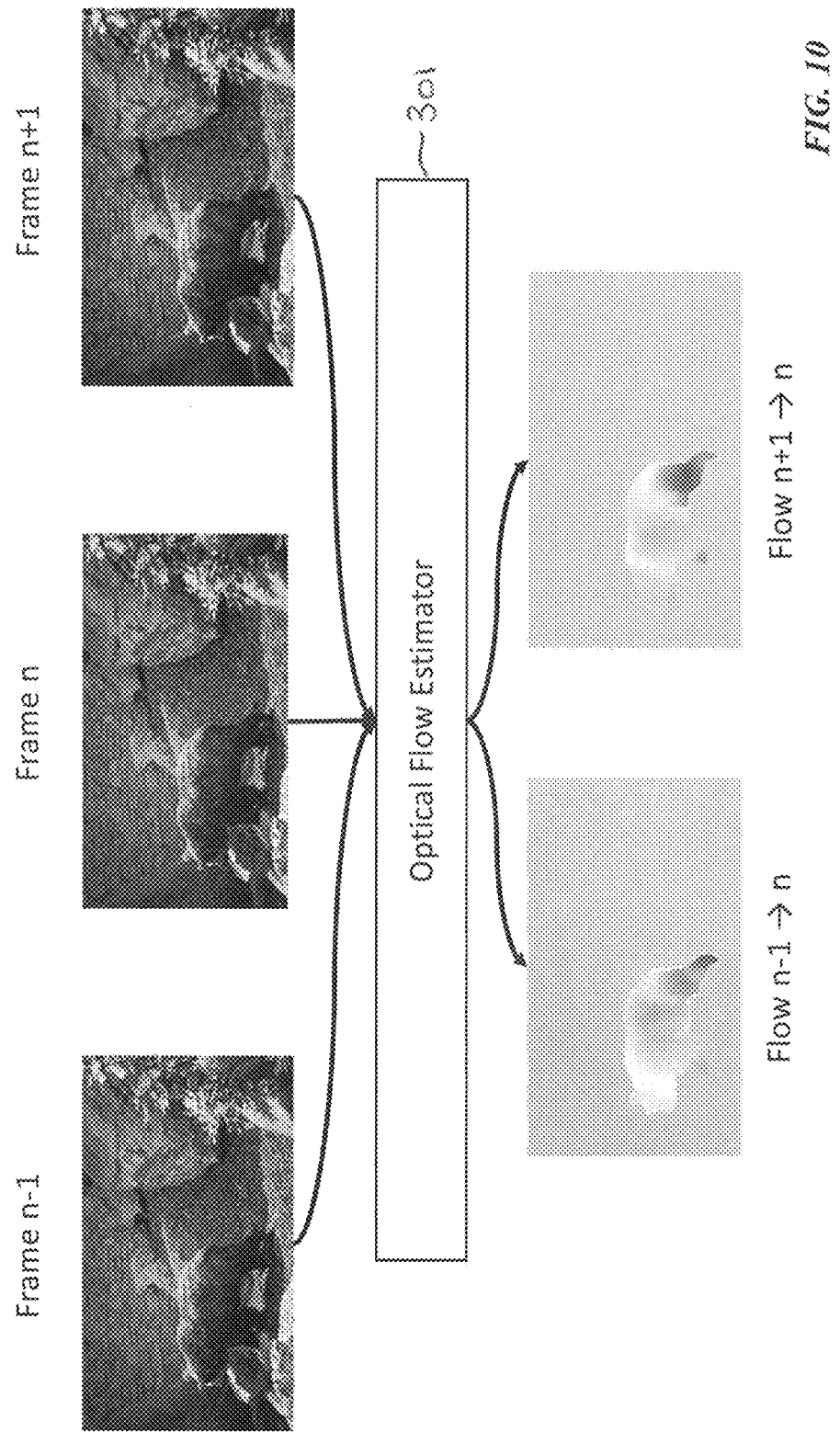
FIG. 10 illustrates a process for optical flow estimation.

Checking the correspondence between the content of said frame and the content of said temporally related frames can include analyzing optical flow between temporally adjacent frames. This can be done using an AI tool such as a Convolutional Neural Network (CNN). One suitable example of such a tool is SelFlow as described by P. Liu, M. Lyu, I. King and J. Xu, "SelFlow: Self-Supervised Learning of Optical Flow," in 2019 IEEE/CVF Conference on Computer Vision and Pattern Recognition (CVPR), Long Beach, CA, USA, 2019 pp. 4566-4575. Such a tool can be used to determine optical flow between frame n and each of the temporally related frames. As illustrated schematically in FIG. 10 the optical flow estimator 301 takes three frames as inputs (Frame n−1, Frame n, Frame n+1) and outputs two outputs (Flow n→n+1, Flow n→n−1), wherein Flow n→n+1 is a forward optical flow estimate from the "central" frame (Frame n in FIGS. 10) to the later frame (Frame n+1) and Flow n→n−1 being a backward optical flow estimate from the central frame (Frame n) to the earlier frame (Frame n−1). In this example, the process is performed using a plurality of temporally related frames with inputs being the central frame (Frame n) and equally spaced pairs of frames before and after the central frame to generate optical flow estimates between each frame and the central frame. However, there is no limitation on the frames being equally spaced, and other unequal spacings can be used in some embodiments.

Figure 11:
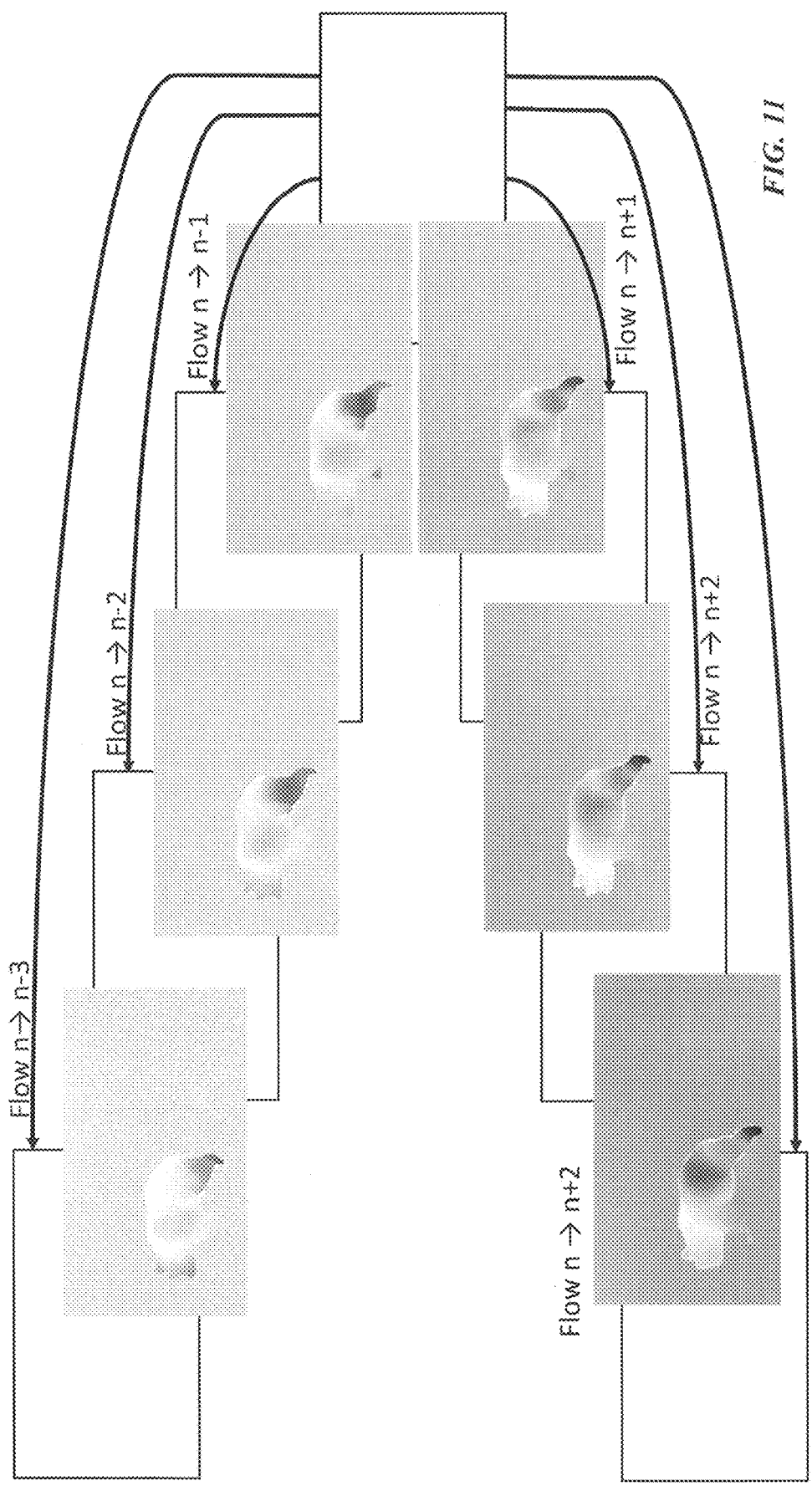
FIG. 11 illustrates an optical flow estimation applied to a plurality of temporally related frames.

A process is set out schematically in FIG. 11 to illustrate the generation of six optical flow estimates. FIG. 11 illustrates the optical flow estimation process from FIG. 10 applied to the frames illustrated in FIG. 4. In this example, 6 optical flow estimates are made, each between a frame (Frames n+1, n+2, n+3) either following the central frame (Frame n) and a frame (frames n−1, n−2, n−3) preceding it. In this case, the optical flow estimator 301 is used 3 times on three groups of frames. That is the optical flow estimator performs a first set of estimations using a first set of frames (Frame n−1, Frame n, Frame n+1) and outputs two optical flow estimations as outputs (Flow n→n+1, Flow n→n−1). The optical flow estimator 301 also performs a second estimation using a second set of frames (Frame n−2, Frame n, Frame n+2) and outputs two optical flow outputs (Flow n→n+2, Flow n→n−2). And the optical flow estimator performs a third set of estimations using a third set of frames (Frame n−3, Frame n, Frame n+3) and outputs two optical flow outputs (Flow n→n+3, Flow n→n−3).

Figure 12:
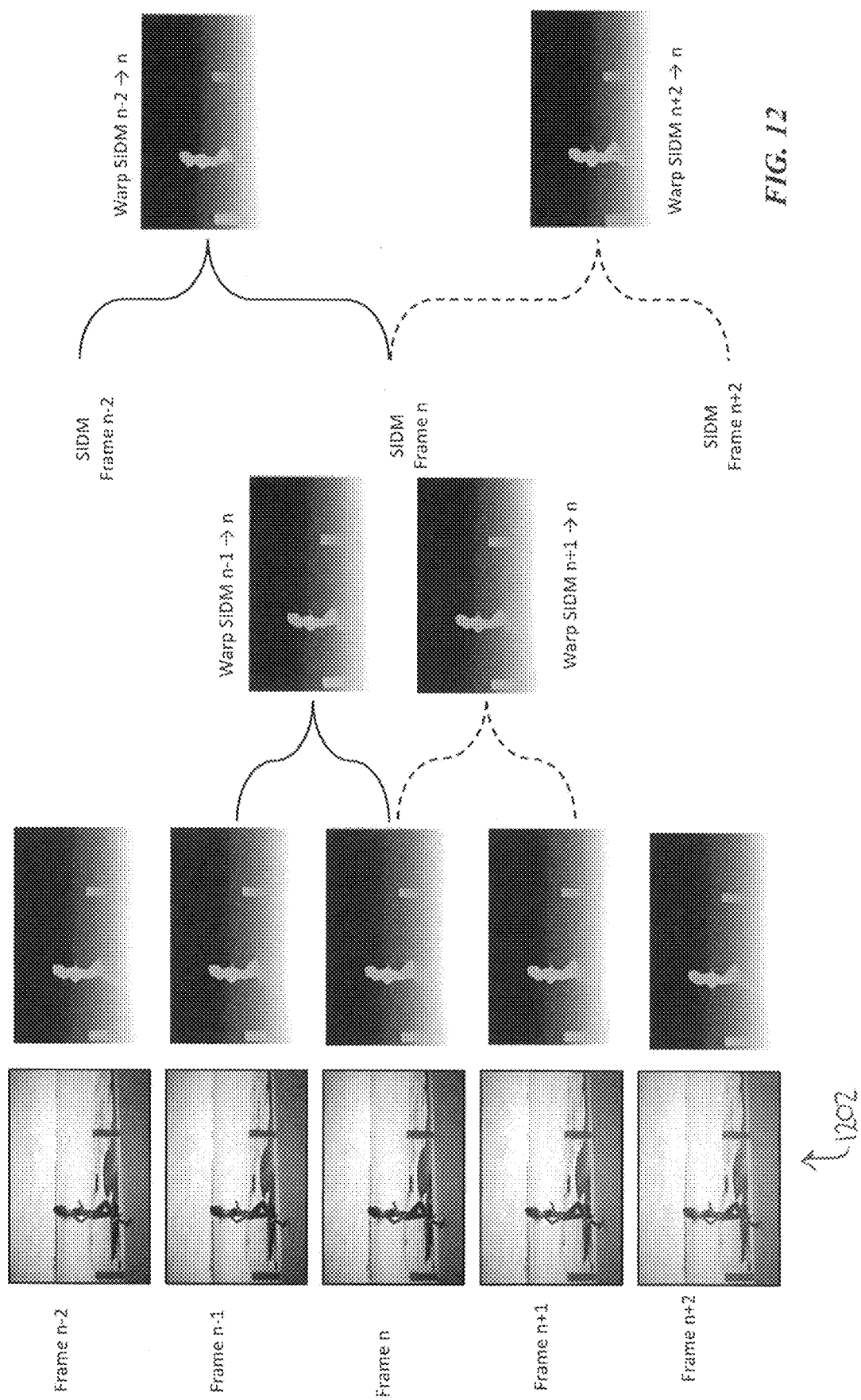
FIG. 12 illustrates a series of frames n−2 to n+2 and schematically represents how warped SIDMs may be created using a backward warp.

Next the optical flow estimates are used to generate a warped depth map for each of said plurality of temporally related frames. This results in a set of warped depth maps, whereby the grid points (in theory) should correlate to the same content within the image, and the regions around the grid points in each warped depth map are directly comparable. FIG. 12 illustrates a series of frames n−2 to n+2 (1202). SIDMs 1204 are created for each frame and optical flow is used to perform a backward warp to generate warped depth maps 1206 "Warp SIDM n−1→n", "Warp SIDM n+1→n", "Warp SIDM n−2→n" and "Warp SIDM n+2→n".

However, optical flow estimation has limitations and its computation itself is a hard problem. So errors in optical flow will result in artefacts in the warped depth maps. To address these artefacts and remove their influence, the areas having such artefacts are identified and a mask may be created. In at least one embodiment, a mask is created by checking the pixel-wise difference between the depth map at current time step (Frame n) and each warped depth map. If the difference is more than a predetermined threshold (e.g., 3.0 in some embodiments), the area is masked. If the difference exceeds the threshold, the pixels are effectively deemed 'unreliable'.

Pixel locations that have a depth value higher than a predetermined threshold (e.g., 25.0) may also be masked. This is because depth of distant objects (for example, sky) can be orders of magnitude larger than nearby objects (for example, the runner in the images of FIG. 12). The inclusion of very few distant pixels in subsequent calculations (e.g., taking an average depth around a grid point that could include sky pixels and runner pixels) will unduly distort the average towards the distant pixels, even though the remainder of the region has foreground content.

Figure 13:
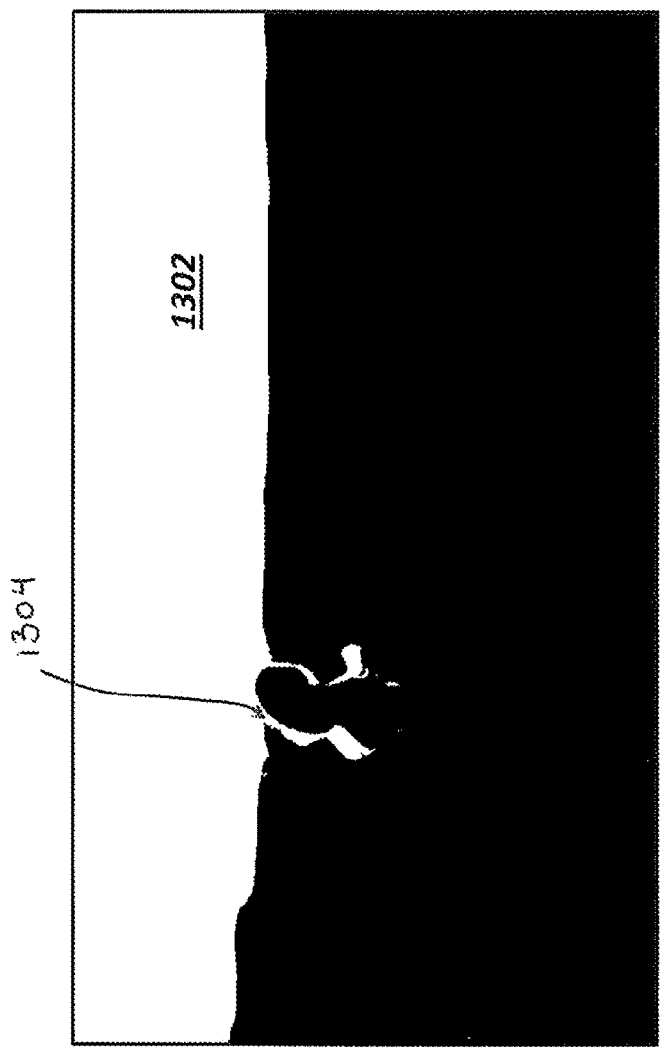
FIG. 13 illustrates a mask used in at least one embodiment.

Accordingly, the "unreliable" pixels and pixels with a depth over a predetermined threshold may be masked. FIG. 13 illustrates such an example mask generated from the frames of FIG. 12. The white regions (i.e., masked pixels), denote un-reliable and distant pixels and black regions denote reliable and nearby pixels that are unmasked. Qualitatively, in FIG. 13 it can be seen that the mask includes the sky 1302 (because it is distant) and some area 1304 around the runner because it contains the greatest variability between depth at current timestep (Frame n) and the frame of the warped depth maps because it represents the interface between the moving runner and the relatively stable background.

A mask excluding only distant pixels may also be used in some embodiments.

In some situations, a mask may be a "single frame mask" that is generated from the SIDM of a current frame (Frame n) and that of a single temporally related frame. Such a mask will be useful in computing an initial scale value for grid points using the single temporally related frame. In other situations, a mask may be a "multiple frame mask" created by the combination of multiple single frame masks. This is performed by using an "OR" operation to combine multiple masks, so that any pixel masked in a single frame mask is masked in the multiple frame mask.

As noted above, generating an initial scale value for a given grid point uses a depth value for the grid point and the depth values for the same grid point from the plurality of temporally related frames. Determining a depth value for the grid point in the frame can involve determining an average depth value for the region including the grid point, but excluding pixels that are masked. For example, due to their being at a distance greater than the predetermined depth. For the temporally related frames, the same process is performed on their respective warped depth maps, that is for each grid point a depth value is computed. The depth value being the average depth value for the region in the warped depth map, but excluding pixels that are masked (e.g., due to their being at a distance greater than the predetermined depth). Thus, in this example with a 25×14 grid points and 7 temporally related frames (Frame n and 6 temporally related frames), a 7×25×14 matrix of average depth values is computed. An initial scale value for each grid point may then be calculated by comparing the depth value of the grid point in the present frame to the group of depth values of the corresponding grid point in the temporally related frames. This can involve determining a ratio of a measure of central tendency of the group of depth values; to the depth value for the grid point.

For example, initial scale value can be calculated as follows:

Inital Scale Value=(Median depth value of group)/
(Depth value in frame n)

The group of depth values for the temporally related frames will typically include the depth value for the grid point, that is in the present illustrative embodiment the group of depth values will include 7 average values.

In alternative embodiments, one may choose to allow the grid points to not exactly match from frame to frame. In this case the "grid" defining the grid point can be warped (e.g., using by image analysis techniques such as optical flow) so that a corresponding grid point moves from frame to frame with the image content, similarly a corresponding region that is a first shape in frame n may take a different shape or different orientation in a temporally related frame due to such warping. FIG. 9 illustrates this schematically again SIDM n, SIDM n−i and SIDM n+i are illustrated with grid points 200Q, 200Q−i and 200Q+i which are surrounded by regions 202Q, 202Q−i and 202Q+i. But as can be seen the grids in frames n+i and n−i are no longer regular square grids, and the areas 202Q−i and 202Q+i have been warped with the grid such that they are displaced a small amount, rotated and possibly re-shaped compared to 202Q. Other processes can be varied mutatis mutandis to accommodate this variation.

Generating Final Scale Values

The initial scale values have some temporal consistency from frame to frame because each successive frame's initial scale value will share some common frames in its determination. But an initial scale value has no regard for spatial consistency, as only spatially corresponding portions of the frames are used in its generation. This is addressed by generating final scale values for each grid point on the basis of said grid point's initial scale value and that of its neighboring grid points.

This process can involve determining a relative contribution of each of the neighboring grid points and said grid point's initial scale value. The relative contribution for said one or more neighboring grid points can be determined in some embodiments using said mask.

Figure 14:
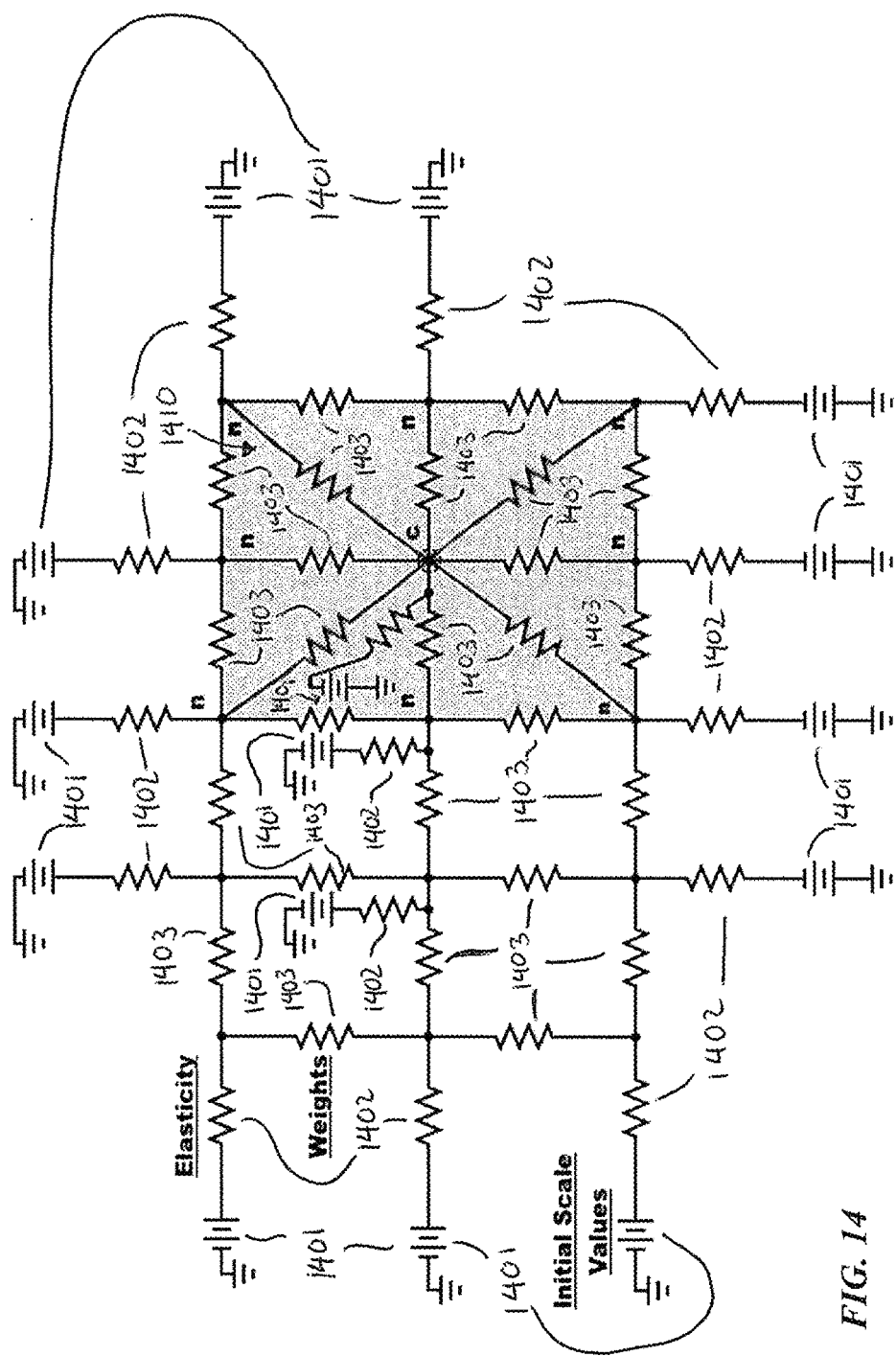
FIG. 14 illustrates a model in the form of a circuit diagram that may be used to determine final scale values in some embodiments.

The task of determining a set of values in such a scenario can be modelled as determining a voltage at each node in a network of resistors, (or equivalently as force at nodes in a network of springs). FIG. 14 illustrates an example of a model network of resistors representing this problem.

In the diagram of FIG. 14 each initial scale value is represented as a battery 1401 having a voltage (b) equal to the initial scale value. The final scale value corresponding to an initial scale value is the voltage at the node in the network closest to the battery representing the initial scale value. These two values are tied together by an "elasticity" that represents how much influence the initial value has over the final value, and is modelled as a resistor 1402 between them. The influence of each neighboring node on the final scale value (represented as node voltage (u)) are set by weights that are represented as resistors 1403 joining neighboring nodes. For convenience and clarity, the "diagonal" connections between nodes are only shown for the node labelled "c" and its neighboring nodes labelled "n". All other "diagonal" connections are also weighted in the same manner but not shown. Node c will be used as an example below.

The voltages (u) can be calculated by solving a set of linear equations representing the model circuit as follows $$A^T C A u = A^T C b \qquad \text{(EQ1)}$$

A is an incidence matrix that defines the connection between nodes. As noted above all neighboring nodes are connected. $A^T$ is the transpose of matrix A.

u is a vector containing the voltages at each node.

b is a vector containing battery voltages that represent the initial scale values.

C is a conductance matrix. This is a matrix with values computed as follows:

First weights are computed for each node. Using the grey highlighted portion 1410 of the circuit in FIG. 14, the weight of node "c" can be determined as follows:

The weight of each node is a weighted average of pixels within the area of influence of the node "c". In this process a "multiple frame mask" can be used to exclude any pixel that is potentially problematic, e.g., due to variation or distance.

This area of influence includes all pixels within an area defined by the neighboring nodes—e.g., for node c it includes all pixels within the square defined by the 8 nodes labelled "n". Qualitatively, if the area of influence contains a high number of masked pixels the initial scale value for that pixel will be unreliable, and its neighbors should have increased influence over the final scale value at that point. This results in a higher conductance for weights connecting the node to its neighbors. Conversely a "reliable" initial value with very few masked pixels will have less conductance to its neighbors and should stay closer to its initial value.

The weights for each area around a node are calculated as follows:

$$w^c = \alpha_1 + \alpha_2 * \frac{1}{N_p} \sum_p \text{Mask}(p) b(p) \quad (EQ2)$$

where $w^c$ is the weighting for given node c, and is a sum over all pixels in the area of influence of the node.

$\alpha_1$ is a scalar value, e.g., 0.1

$\alpha_2$ is a scalar value e.g., 10.0—the relative values of $\alpha_1$ and $\alpha_2$ set the relative importance of masked and unmasked pixels.

$N_p$ is the Number of pixels in the area of influence.

Mask(p) is the mask value at the location of pixel (p) 1=masked and 0 for unmasked. Hence unmasked pixels contribute 0 to the sum.

b(p) is a bilinear coefficient of the pixel at location (p) and is derived using the distance between the pixel location (p) and the node location (c).

Once $w^c$ is calculated for the node (c) the conductance $C_{cn}$ between the node (c) and each neighboring node (n) is computed as follows:

$$C_{cn} = \max(w^c, w^n) \quad (EQ3)$$

Accordingly, each node has 8 conductances (one for each "resistor" 1403 in FIG. 14 linking it to each of its neighboring nodes) and one conductance to its initial value. The conductance to the node's initial scale value may be fixed, e.g., 1 in this example.

Accordingly, a conductance matrix C can be generated, and EQ1 solved to generate a u vector that represents the final scale values for the grid points for frame n. This only involves solving a set of linear equations, which is relatively straightforward and fast compared to the optimization approaches of some prior art.

Determining Final Scale Values for All Pixels

As noted above, there are fewer grid points for which final scale values are computed in step 160 than pixels in the single image depth map of the frame. Thus, in some embodiments, it is necessary to use the final scale values of the grid points to determine the scale value to be applied to each pixel of the SIDM. In some embodiments, this includes interpolating scale values between the grid points (e.g., using bilinear interpolation). If there are pixels in the SIDM that lie outside the outermost grid points, extrapolation from the final scale values at the grid point can be used to generate scale values for application to these pixels. However, it may not be strictly necessary to have individual scale values for all pixels in the SIDM of the frame. Thus, in some embodiments, interpolation or extrapolation may not increase the number of scale values to match the full resolution of the frame or SIDM. In other embodiments, the scale values for application to each pixel of said SIDM from the final scale values of the grid points, can be determined by assigning a scale value for each pixel based on their position relative to said grid points. For example, all pixels in an area around each grid point may take the scale value corresponding to the grid point.

Once the scale values for each pixel in the SIDM are determined, these values are multiplied by their corresponding SIDM depth pixel value to determine a scaled SIDM for Frame n.

Advantageously, in some embodiments those portions of steps 12 to 16 of FIG. 2 or steps 120 to 170 of FIG. 3 can be repeated to generate scaled SIDM (sSIDM) for other frames of the video clip 110. These additional sSIDM may then be used in step 140 to generate the final depth map for Frame n (DMn) which may further reduce the appearance of flickering depth maps for the video clip.

Figure 15:
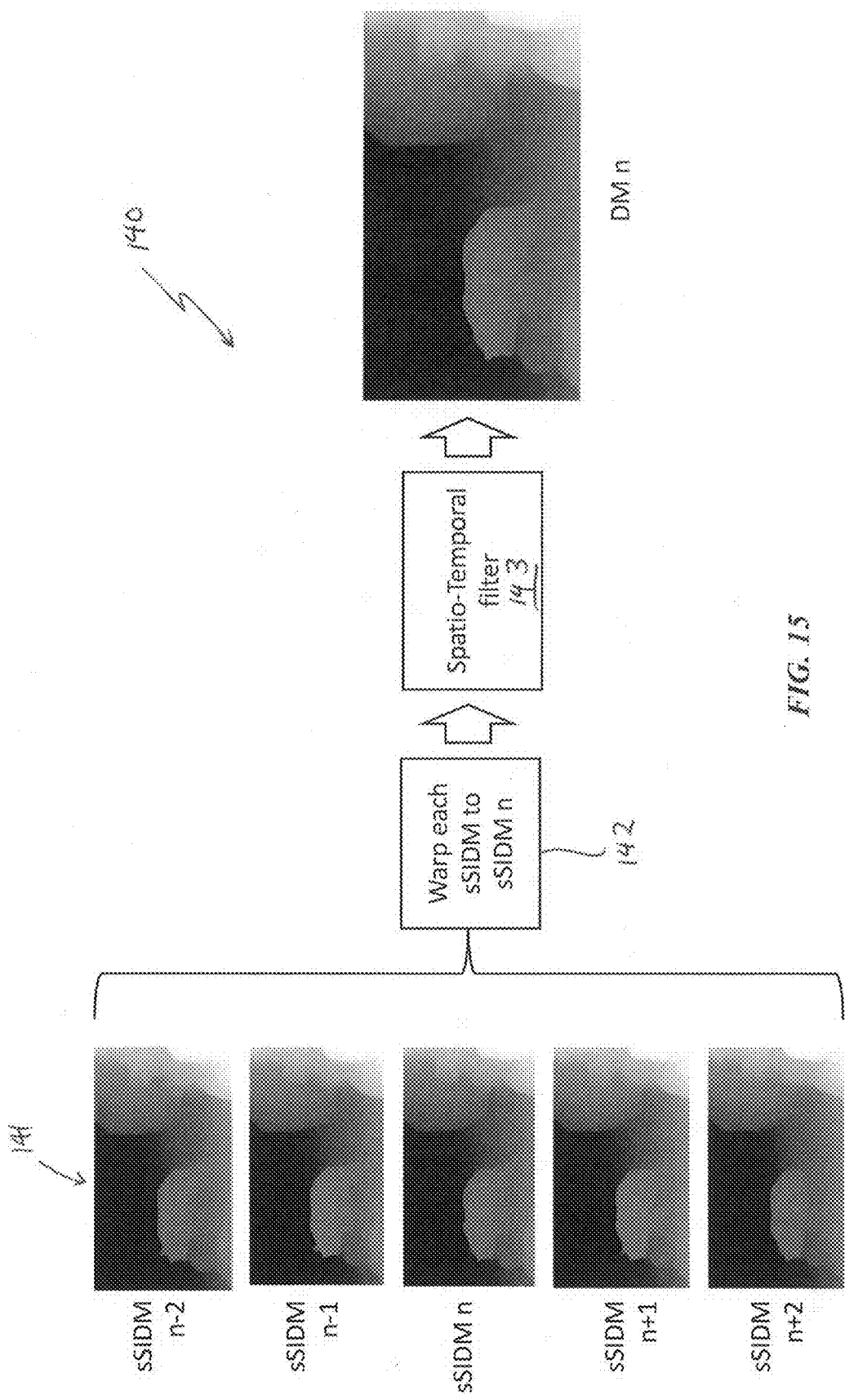
FIG. 15 schematically illustrates a process using spatiotemporal filtering sSIDMs to generate the final depth map for frame n.

Now, returning again to FIG. 3, in step 140 a time sequence of scaled single image depth maps sSIDM are processed to generate a depth map corresponding to the Frame n (DMn). The spatio-temporal filtering step can be performed using the process set out in equations (7) and (8) of in "*Robust Consistent Video Depth Estimation*" by Kopf et. al. The number of scaled single image depth maps in the time sequence is selectable. In some embodiments, it may include between 1 and 5 frames before and after Frame n. FIG. 15 shows the steps in an embodiment of sub-process 140. Step 140 begins at 141 with a time sequence of scaled single image depth maps generated in step 130. In this example, a group of 5 sSIDM are used, namely sSIDM n, sSIDM n+1, sSIDM n−1, sSIDM n+2, sSIDM n−2. The number of frames can be chosen based on the computational budget to achieve the extent of temporal smoothing desired. "*Robust Consistent Video Depth Estimation*" by Kopf et. al. uses 4 each side of the target frame ($\tau$=4). Next, at 142, each sSIDM is warped back to sSIDM n using the previously computed optical flow estimations. This results in a series of warped sSIDM frames. The warped sSIDM frames can then be processed in step 143, using equations (7) and (8) of "*Robust Consistent Video Depth Estimation*" by Kopf et al. to perform spatio-temporal filtering by generating a weighted average over the time series of warped sSIDMs in a neighborhood around each pixel. In at least one embodiment, a neighborhood of 3×3 pixels can be used. However, the size of the filter neighborhood can be changed to modify the spatial filtering characteristics with commensurate changes in computation requirements. The final output DMn is a smoothed depth map suitable for use in further processing of the video clip 110.

Figure 16:
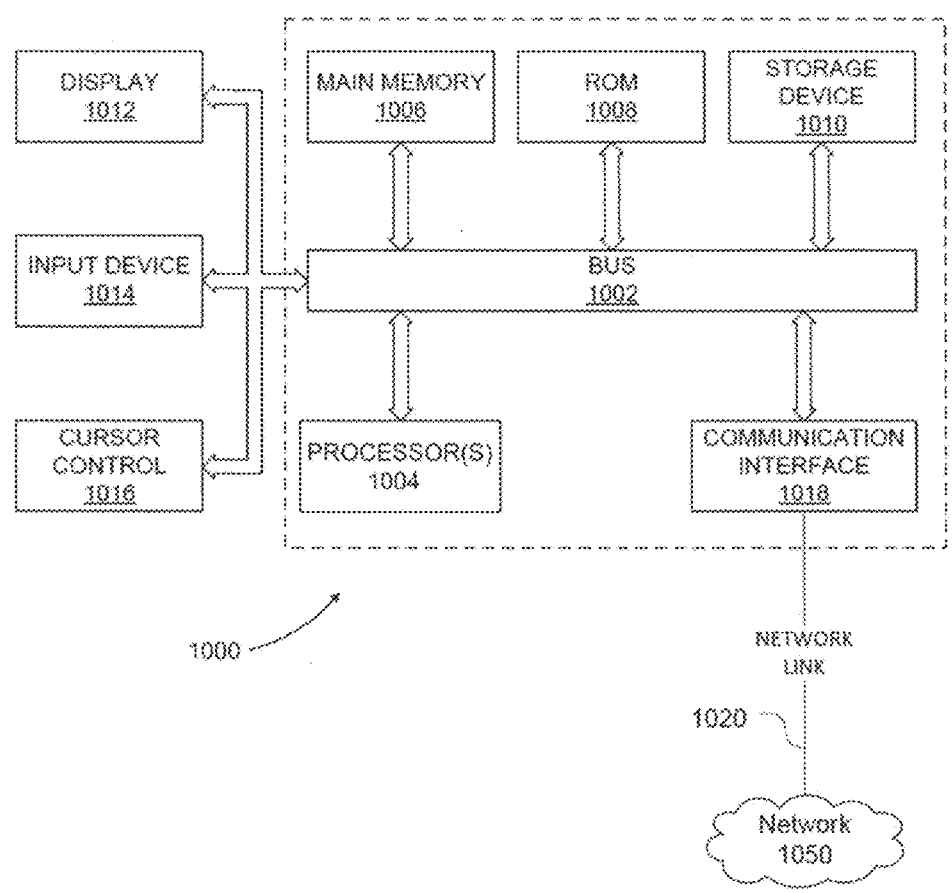
FIG. 16 is a schematic block diagram of a first embodiment of a computer system according to an embodiment disclosed herein.

FIG. 16 provides a block diagram that illustrates one example of a computer system 1000 on which embodiments of the disclosure may be implemented. Computer system 1000 includes a bus 1002 or other communication mechanisms for communicating information, and a hardware processor 1004 coupled with bus 1002 for processing information. Hardware processor 1004 may be, for example, one or more general-purpose microprocessor, one or more graphics processing unit, or other type of processing unit, or combinations thereof.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized and configured to perform the operations specified in the instructions.

Computer system 1000 may further include a read only memory (ROM) 1008 or other static storage device coupled to bus 1002 for storing static information and instructions for processor 1004. A storage device 1010, such as a magnetic disk or optical disk, may be provided and coupled to bus 1002 for storing information and instructions including the video editing software application described above.

The computer system 1000 may be coupled via bus 1002 to a display 1012 (such as one or more LCD, LED, touch screen displays, or other display) for displaying information to a computer user. An input device 1014, including alphanumeric and other keys, may be coupled to the bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to at least one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions.

The terms "storage media" or "storage medium" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, hard disk drive, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Computer system 1000 may also include a communication interface 1018 coupled to bus 1002. Communication interface 1018 provides a two-way data communication coupling to a network link 1020 that is connected to communication network 1050. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Any definitions expressly provided herein for terms contained in the appended claims shall govern the meaning of those terms as used in the claims. No limitation, element, property, feature, advantage, or attribute that is not expressly recited in a claim should limit the scope of the claim in any way.

As used herein, the terms "include" and "comprise" (and variations of those terms, such as "including", "includes", "comprising", "comprises", "comprised" and the like) are intended to be inclusive and are not intended to exclude further features, components, integers or steps.

For aspects of the disclosure that have been described using flowcharts, a given flowchart step could potentially be performed in various ways and by various devices, systems or system modules. A given flowchart step could be divided into multiple steps and/or multiple flowchart steps could be combined into a single step, unless the contrary is specifically noted as essential. Furthermore, the order of the steps can be changed without departing from the scope of the present disclosure, unless the contrary is specifically noted as essential.

The various embodiments described above can be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of generating a depth map corresponding to a frame of a sequence of frames in a video clip, the method comprising:
   generating a single image depth map for each frame of a plurality of frames;
   scaling the single image depth map for each frame to generate a scaled single image depth map for said each frame by applying a scale value to each pixel of said single image depth map, wherein the scale value for each pixel of the single image depth map is generated using a method comprising:
      for each grid point of a plurality of grid points which are arranged across the frame:
         generating an initial scale value using a depth value for the grid point and depth values corresponding to the same grid point from a plurality of temporally related frames;
         generating a final scale value for said grid point on the basis of said grid point's initial scale value and the initial scale value of one or more neighboring grid points; and
         determining corresponding scale values for application to each pixel of said single image depth map from the final scale values of the grid points; and
   processing a time sequence of scaled single image depth maps to generate said depth map corresponding to the frame of the sequence of frames in the video clip.

2. The method of claim 1 wherein the step of generating an initial scale value using a depth value for the grid point and depth values for the same grid point from a plurality of temporally related frames comprises determining a depth value for the grid point in said frame by determining an average depth value for a region including the grid point; and wherein determining depth values corresponding to the same grid point for a plurality of temporally related frames comprises:
determining a correspondence between content of said frame and content of said temporally related frames such that a location corresponding to said grid point can be determined for each of the plurality of temporally related frames, and
determining an average depth value for a region including said location in each temporally related frame to determine a depth value corresponding to said grid point for each temporally related frame.

3. The method of claim 2 wherein the initial scale value for each grid point is determined using a ratio of:
a measure of central tendency of a group of depth values including at least the depth values for the same grid point from the plurality of temporally related frames, to the depth value for the grid point.

4. The method of claim 3 wherein the group of depth values includes the depth value for the grid point.

5. The method of claim 2 wherein determining a correspondence between the content of said frame and the content of said temporally related frames includes analyzing optical flow between temporally adjacent frames and generating a warped depth map of each of said plurality of temporally related frames in accordance with the optical flow, whereby said location corresponding to said grid point is aligned with said grid point, and determining the average depth value for the region around said location in each temporally related frame uses the warped depth map.

6. The method of claim 5 wherein the method further includes defining a mask including pixels of said frame in which the single image depth map is determined to be either or both of:
unreliable based on optical flow analysis of the plurality of frames; or
have a depth greater than a threshold depth,
and, wherein at least one of:
determining a depth value for the grid point by determining an average depth value for a region including the grid point, and/or
determining depth values corresponding to the same grid point for a plurality of temporally related frames, excludes pixels that are included in said mask.

7. The method of claim 2 wherein determining a correspondence between the content of said frame and the content of said temporally related frames includes analyzing optical flow between temporally adjacent frames and tracking the location of said grid point in each of said temporally related frames using said optical flow and determining the average depth value for a region around said location in each temporally related frame.

8. The method of claim 7, wherein the method further includes defining a mask including pixels of said frame in which the single image depth map is determined to be either or both of:
unreliable based on optical flow analysis of the plurality of frames; or
have a depth greater than a threshold depth,
and, wherein at least one of:
determining a depth value for the grid point by determining an average depth value for a region including the grid point, and/or
determining depth values corresponding to the same grid point for a plurality of temporally related frames, excludes pixels that are included in said mask.

9. The method of claim 1 wherein the method includes defining a mask including pixels of said frame in which the single image depth map is determined to be either or both of:
unreliable based on optical flow analysis of the plurality of frames; or
have a depth greater than a threshold depth.

10. The method of claim 1, wherein the step of generating a final scale value for said grid point on the basis of said grid point's initial scale value and an initial scale value of one or more neighboring grid points comprises:
determining a relative contribution of each of said one or more neighboring grid points and said grid point's initial scale value.

11. The method of claim 10 wherein the method further includes:
defining a mask including pixels of said frame in which the single image depth map is determined to be either or both of:
unreliable based on optical flow analysis of the plurality of frames; or
have a depth greater than a threshold depth; and
determining a relative contribution for said one or more neighboring grid points based on said mask.

12. The method of claim 1 wherein generating a final scale value for said grid point on the basis of said grid point's initial scale value and an initial scale value of one or more neighboring grid point includes solving a series of linear equations representing an initial scale value of each of said grid points and the initial scale value for each of said grid point's neighboring grid points.

13. The method of claim 1 wherein determining corresponding scale values for application to each pixel of said single image depth map from the final scale values of the grid points comprises generating a scale value for each pixel between said grid points by interpolation.

14. The method of claim 1 wherein determining corresponding scale values for application to each pixel of said single image depth map from the final scale values of the grid points comprises assigning a scale value for each pixel based on a position relative to said grid points.

15. The method of claim 1 wherein generating said single image depth map for each frame comprises using a deep learning model to generate said single image depth map.

16. The method of claim 15 wherein using said deep learning model comprises using a convolutional neural network to generate said single image depth map.

17. A computer system including a processor operating in accordance with execution instructions stored in a non-transitory storage medium, whereby the instructions, when executed, configure the computer system to perform the method of claim 1.

18. The computer system of claim 17 wherein the instructions, when executed, further configure the computer system to perform the operations of a non-linear editor.

19. Non-transitory computer-readable storage media storing thereon execution instructions which when executed by a processor cause the processor to perform the method of claim 1.

20. The non-transitory computer-readable storage media of claim 19 further comprising execution instructions to perform the operations of any one or more of a non-linear editor and a video effects software application.

* * * * *